United States Patent [19]
Doubrava et al.

[11] Patent Number: 5,326,940
[45] Date of Patent: Jul. 5, 1994

[54] DYNAMICALLY-ADJUSTABLE SCANNING RATE IN DIGITIZERS

[75] Inventors: Dana Doubrava; Waldo L. Landmeier, both of Phoenix, Ariz.

[73] Assignee: CalComp Inc., Anaheim, Calif.

[21] Appl. No.: 903,605

[22] Filed: Jun. 23, 1992

[51] Int. Cl.$^5$ .............................................. G08C 21/00
[52] U.S. Cl. ......................................... 178/18; 178/19
[58] Field of Search ............................. 178/18, 19, 20; 304/706, 705, 711, 712

[56] References Cited

U.S. PATENT DOCUMENTS

| | | | |
|---|---|---|---|
| 4,255,617 | 3/1981 | Carau, Sr. et al. | 178/19 X |
| 4,686,331 | 8/1987 | Borsess | 178/19 |
| 5,229,551 | 7/1993 | Mcdermott et al. | 178/18 |

Primary Examiner—Stephen Chin
Assistant Examiner—Paul Loomis
Attorney, Agent, or Firm—Wm. F. Porter, Jr.; Donald A. Streck

[57] ABSTRACT

Methods and apparatus for setting the signal-sampling period of each grid wire in a digitizing tablet having grid wires that are sequentially and repetitively scanned to develop a positional signal related to a cursor so as to reduce jitter associated with non-movement of the cursor and signal error associated with rapid movement of the cursor. The method comprises setting the signal-sampling period of each grid wire to a longest signal-sampling period the digitizer tablet is designed to employ if the cursor is not moving and setting the signal-sampling period of each grid wire to a value inversely related to the present speed of movement of the cursor such that the faster the present speed of movement of the cursor the shorter the signal-sampling period of each grid wire as compared to the longest signal-sampling period the digitizer tablet is designed to employ. The present position of the cursor is then saved as the prior position of the cursor for the next time the steps of the method are performed. The method can also be applied to other positional determination devices in which a cursor is moved over a scanned sensing surface. The apparatus performs the method.

12 Claims, 3 Drawing Sheets

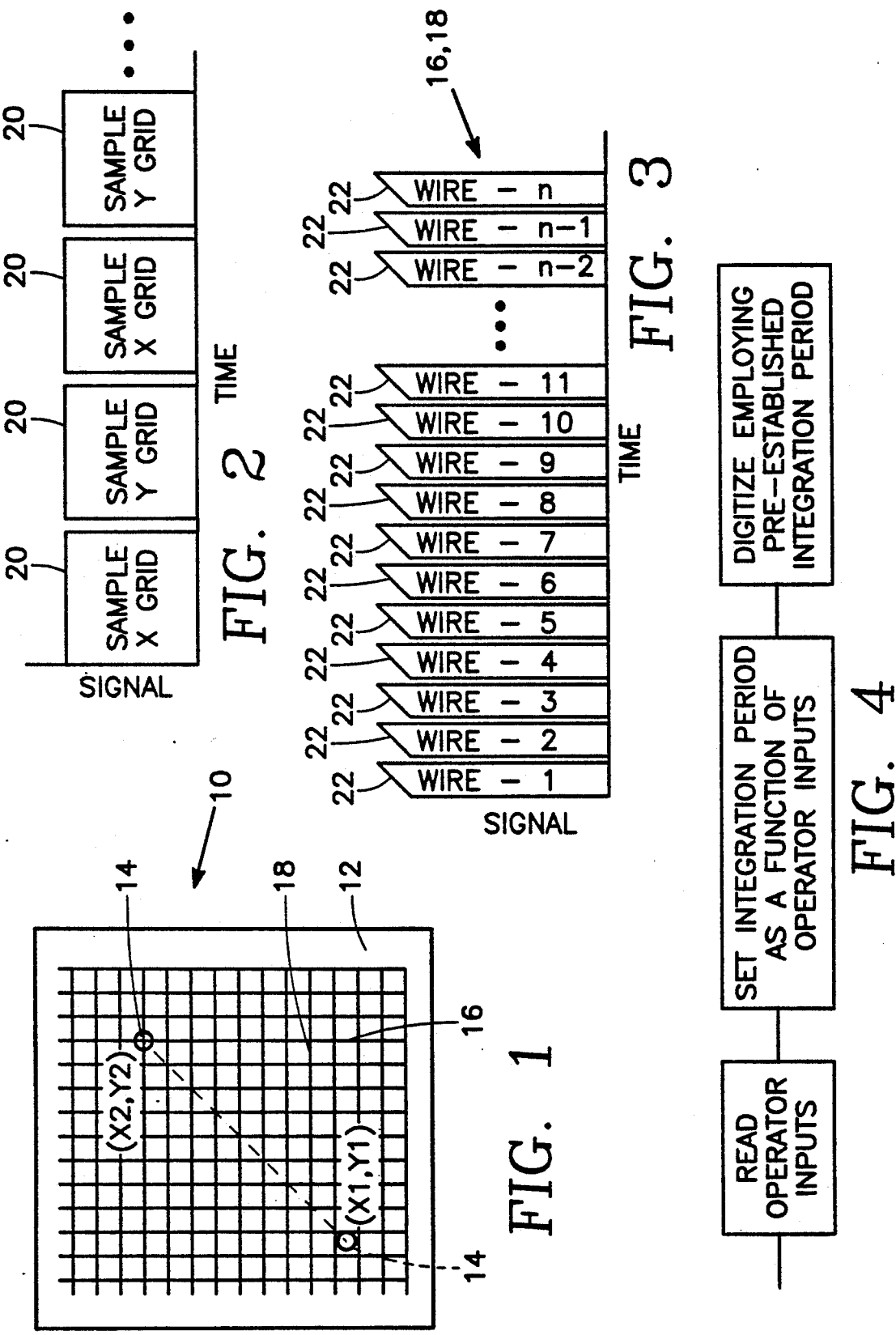

DYNAMICALLY-ADJUSTABLE SCANNING RATE IN DIGITIZERS

BACKGROUND OF THE INVENTION

This invention relates to positional determination systems and devices such as digitizers and, more particularly, to a method and associated apparatus for dynamically setting the scanning rate of positional sensing elements of the device in direct relation to the speed of movement of a cursor over a sensing surface of the device so that the faster the cursor is moving, the faster the scanning rate and the shorter the time each sensing element is sampled.

Electro-magnetic digitizers are well known in the art. As depicted in FIG. 1, a typical electro-magnetic digitizer 10 comprises a tablet 12 over which a cursor 14 is moved to input positional information to a computer connected to the tablet 12. The tablet 12 contains a grid of wires used to sense the position of the cursor 14. There are a plurality of equally-spaced X-wires 16 and a plurality of equally-spaced Y-wires 18 perpendicular to the X-wires 16. Either the wires 16, 18 can be powered and the electro-magnetic signal from the wires 16, 18 detected in the cursor 14 or the cursor 14 can be powered and the electro-magnetic signal from the cursor 14 detected in the wires 16, 18. A powered cursor 14 is preferred for so-called "cordless" digitizers in which the cursor 14 has no physical connection to the tablet 12.

Since the wires 16, 18 are spaced and discrete, it is impossible to develop a continuous signal indicating the position of the cursor 14 in the coordinate system defined by the wires 16, 18. The wires 16, 18 must be scanned sequentially to determine the signal being developed in each as a result of the electro-magnetic signal from the cursor 14. Then, the position of the cursor 14 can be determined mathematically from the data using well-known techniques. Typically, the approach is as depicted in FIG. 2. First, the electronic associated with the tablet 12 scans (i.e. sequentially samples) the signals on the wires 16 of the X grid and then the wires 18 of the Y grid are scanned. This process repeats continually to develop the necessary signals for position determination of the cursor 14.

Within each grid sample period 20, the wires 16 or 18 of a particular grid are sampled sequentially as depicted in FIG. 3. Actually, each sample 22 of a wire 16, 18 is an integration process of the signal being induced into the wire by the electro-magnetic signal from the cursor 14. The integration period for each wire 16, 18 determines the length of each grid sample period 20 and the length of each grid sample period 20 determines the overall scanning rate of the tablet.

Early digitizers operating in the above-described manner had a fixed integration period for each wire 16, 18 as determined at the time of manufacture. More recently, digitizers operating in the above-described manner have been provided with a statically adjustable integration period for each wire 16, 18 as determined from operator inputs at the time of and prior to digitizing with the digitizer as depicted in FIG. 4. In this prior art approach, the logic of the digitizer first reads the inputs from the operator. It next sets the integration period for the wires 16, 18 as a pre-established function of the operator inputs. Digitizing is then accomplished using this pre-established integration period for the wires 16, 18 for all functions of the digitizer.

The problem is that a digitizer is a dynamic device which respond differently under different dynamic conditions. If the cursor 14 is unmoving at position X1, Y1 in FIG. 1 there is one response. If the cursor 14 is moving position X1, Y1 to position X2, Y2 slowly, there is a second response. If the cursor 14 is moving position X1, Y1 to position X2, Y2 rapidly, there is yet a third response. As the integration rate is reduced (i.e. the wires 16, 18 are scanned at a faster rate), the noise (resulting in data jitter) of the system gets worse. This is most evident when the cursor 14 is not moving. Thus, to reduce jitter when the cursor 14 is not moving or moving very slowly, one should employ a slow scanning rate. On the other hand, if the cursor 14 is moved rapidly employing a slow scanning rate, there can be considerable positional error in the signal. If one pictures the cursor 14 being moved in a curve at high speed at an extremely slow scanning rate (approaching the ridiculous for demonstration purposes), it will be realized that the cursor 14 can be "seen" at the start of the curve and not "seen" again until the end of the curve. Thus, the positional data developed will indicate that the cursor 14 jumped from the starting position to the ending position along an assumed straight line. In the prior art system of FIG. 4, therefore, the operator (and the tablet logic) are placed on the horns of a dilemma as to what integration rate to employ. Typically, a middle point is chosen such that if the cursor 14 is moved at medium speed the developed signal will be acceptable. While at rest, the cursor 14 may have signal jitter and during rapid movement, the cursor 14 may suffer from positional inaccuracies.

Other positional devices which scan sensing elements in relationship to a cursor moved over a sensing surface encounter a similar problem. It is particularly important to solve the problem in the pen-based computer systems presently being developed where the digitizing surface is associated with a relatively small display panel and the cursor is pen-shaped. In such systems, faithful reproduction of the pen movement in the data supplied to the computer is particularly important.

Wherefore, it is an object of the present invention to provide a method of operating electro-magnetic scanning digitizers to prevent signal jitter at slow cursor speeds and during cursor non-movement. non-movement.

It is another object of the present invention to provide a method of operating electro-magnetic scanning digitizers to prevent signal error at high cursor speeds and during cursor non-movement.

It is still another object of the present invention to provide a method of operating electro-magnetic scanning digitizers in which the scanning speed of the grid wires is dynamically adjustable.

It is yet another object of the present invention to provide a method of operating positional devices which scan sensing elements in relationship to a cursor moved over a sensing surface to prevent signal error at high cursor speeds and during cursor non-movement.

It is a further object of the present invention to provide a method of operating pen-driven computing devices having a pen-shaped cursor which is moved over a sensing surface to assure highly accurate positional reproduction and prevent signal error at high cursor speeds and during cursor non-movement.

Other objects and benefits of the invention will become apparent from the detailed description which follows hereinafter when taken in conjunction with the drawing figures which accompany it.

SUMMARY

The foregoing objects have been achieved in a digitizer tablet having grid wires that are sequentially and repetitively scanned to develop a positional signal related to a cursor, by the method of the present invention for setting the signal-sampling period of each wire to reduce jitter associated with non-movement of the cursor and signal error associated with rapid movement of the cursor comprising the periodically performed steps of:

a) comparing the present position of the cursor to the prior position of the cursor when the steps of the method were performed previously;

b) if the cursor has not moved from the prior position, setting the signal-sampling period of each wire to a longest signal-sampling period the digitizer tablet is designed to employ and proceeding to step (f);

c) if the cursor has moved from the prior position, determining the present speed of movement of the cursor;

d) determining a signal-sampling period of each wire inversely related to the present speed of movement of the cursor such that the faster the present speed of movement of the cursor, the shorter the signal-sampling period of each wire as compared to the longest period employed;

e) setting the signal-sampling period of each wire to that determined in step (d); and, f) saving the present position of the cursor as the prior position of the cursor.

In the preferred implementation, the steps of the method are performed each time before the wires of the digitizer tablet are sequentially scanned.

The objects have also been realized in a positional sensing device having sensing elements that are sequentially and repetitively scanned by scanning apparatus to develop a positional signal related to a cursor by apparatus according to the present invention for setting the signal-sampling period of each sensing element to reduce jitter associated with non-movement of the cursor and signal error associated with rapid movement of the cursor comprising, scanning rate adjustment apparatus connected to the scanning apparatus for adjusting the signal-sampling period of each sensing element of the scanning apparatus and control apparatus connected to the scanning rate adjustment apparatus for inputting signal-sampling period values to the scanning rate adjustment apparatus by—comparing the present position of the cursor to the prior position of the cursor, if the cursor has not moved from the prior position, setting the signal-sampling period value so that the signal-sampling period of each sensing element is a longest signal-sampling period the digitizer tablet is designed to employ saving the present position of the cursor as the prior position of the cursor and exiting. If the cursor has moved from the prior position, calculating the present speed of movement of the cursor, determining a signal-sampling period of each sensing element inversely related to the present speed of movement of the cursor such that the faster the present speed of movement of the cursor, the shorter the signal-sampling period of each sensing element as compared to the longest period employed setting the signal-sampling period value so that the signal-sampling period of each sensing element is that just determined, and saving the present position of the cursor as the prior position of the cursor.

DESCRIPTION OF THE DRAWINGS

FIG. 1 is a simplified drawing of a digitizer tablet as wherein the present invention is applicable.

FIG. 2 is a simplified drawing depicting the way in which the X and Y grids of the digitizer of FIG. 1 are scanned.

FIG. 3 is a simplified drawing depicting the way in which the individual wires of the X and Y grids of the digitizer of FIG. 1 are scanned.

FIG. 4 is a high-level functional flowchart of a prior art approach to statically adjustably setting the scan rate of a digitizer.

DESCRIPTION OF THE PREFERRED EMBODIMENT

As described above, the problems of signal jitter at times of cursor stability and of signal error during times of high-speed cursor movement are present in a variety of positional sensing systems. The solution of the present invention to this common problem will be described hereinafter with respect to an electro-magnetic digitizer tablet having a driven cursor and a passive tablet in which the signals from the cursor are sensed by way of example. The use of the particular example should not be taken as limiting to the present invention or the breadth accorded the claims appended hereto.

Figure 5:
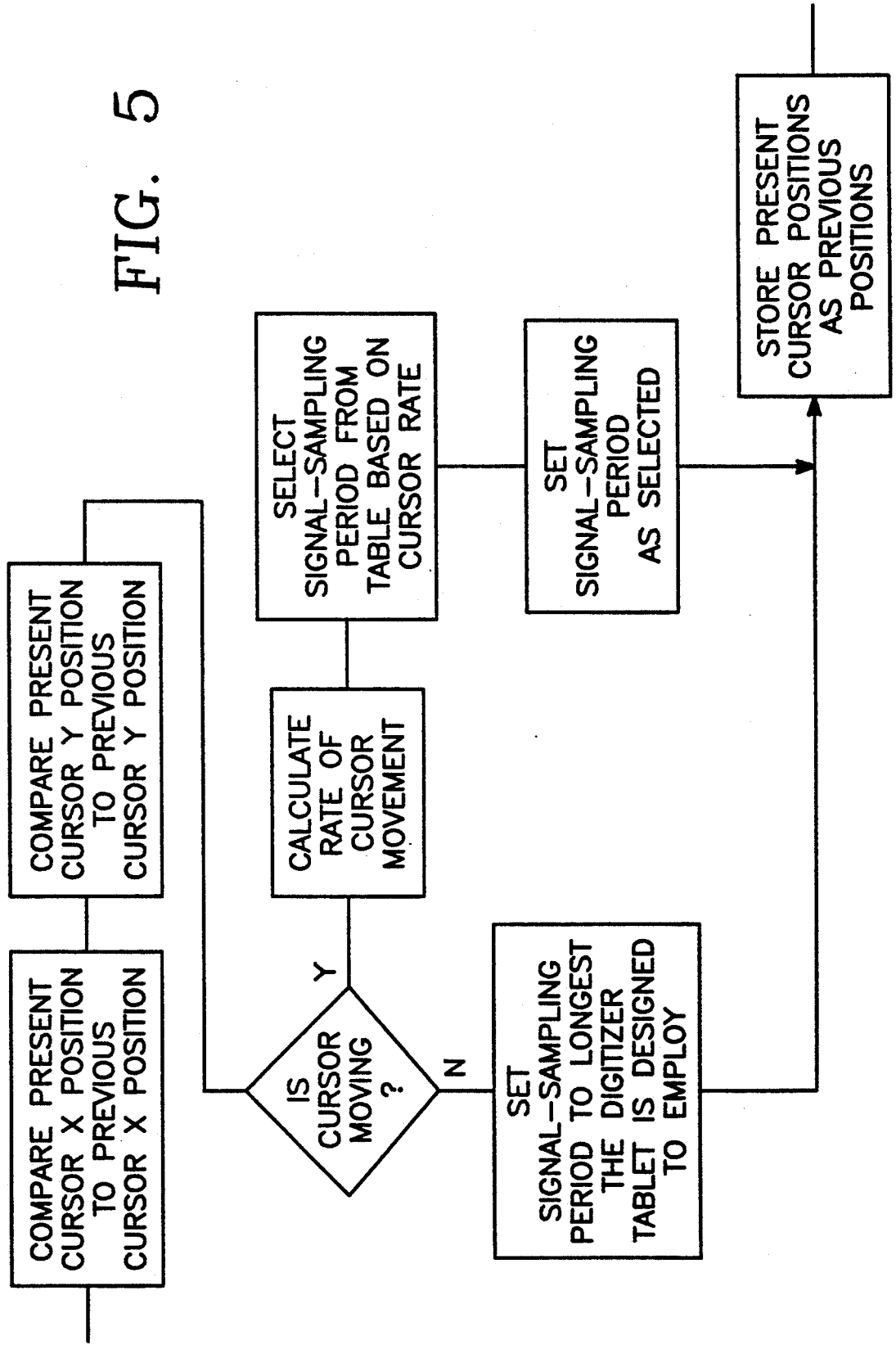
FIG. 5 is a high-level functional flowchart of the approach of the present invention to dynamically adjustably setting the scan rate of a digitizer.

The foregoing objects have been achieved in one instance by incorporating the logic of FIG. 5 into the tablet logic of an electro-magnetic digitizer 10 such as that of FIG. 1.

At the beginning of each scanning cycle (or "n" cycles if desired to reduce the computational power required), the logic first compares the present cursor location in the X and Y directions to its prior position (i.e. the position at the time the logic of FIG. 5 was executed). If they are the same in both directions, the cursor is not moving and the logic sets the integration period to the longest (i.e. the slowest scan rate).

If the cursor is moving in either direction, the rate of cursor movement is calculated using well known mathematical techniques since the change in position is the distance moved and the time of the change is known (being the time between executions of the logic of FIG. 5). Once the rate of movement of the cursor has been determined, an integration period can be selected based on that rate. If desired, the integration period can be calculated. Since the integration period is not so dynamically critical along the range of possible speeds, however, a table look-up or simple decisional branch pickup is preferred. In other words, depending on whether the rate falls within ranges corresponding to slow, medium, and fast, an appropriate integration period can be selected. Such an approach is fast so as to be executable at the beginning of each scanning cycle without taxing the computational power of the digitizer to do its primary job of digitizing. Such an approach adds virtually no cost to the digitizer as well—while affording a substantial and quite visible improvement in performance to the user. Of course, regardless of the approach employed, as the speed of the cursor over the surface of the tablet increases, the integration period should become shorter thereby making the scanning faster so that the samples are taken more often along the cursor's path of rapid movement and an accurate signal reflecting that path of movement is developed.

At the end of the logic of FIG. 5, the present position of the cursor is stored as the previous position to be used at the next execution of the logic.

In tested embodiments of the above-described invention, the results of dynamically changing the integration period for the grid wires as a function of cursor speed over the surface of the tablet from position to position was quite dramatic, being far more effective than one would have imagined for such a minor improvement.

The way that the foregoing techniques and methods of operation can be adapted to other positional systems wherein a cursor is moved over a sensing surface containing sensing elements which are scanned (actively or passively) to provide positional data on the cursor should be readily apparent to ones of ordinary skill in the art without undue experimentation. For example, if the device was a digitizer tablet with grid wires that were powered in a scanning pattern to develop a signal sensed by the cursor, it is the time of applied power and thereby the scanning rate which would be adjusted according to the above-described techniques of the present invention.

Figure 6:
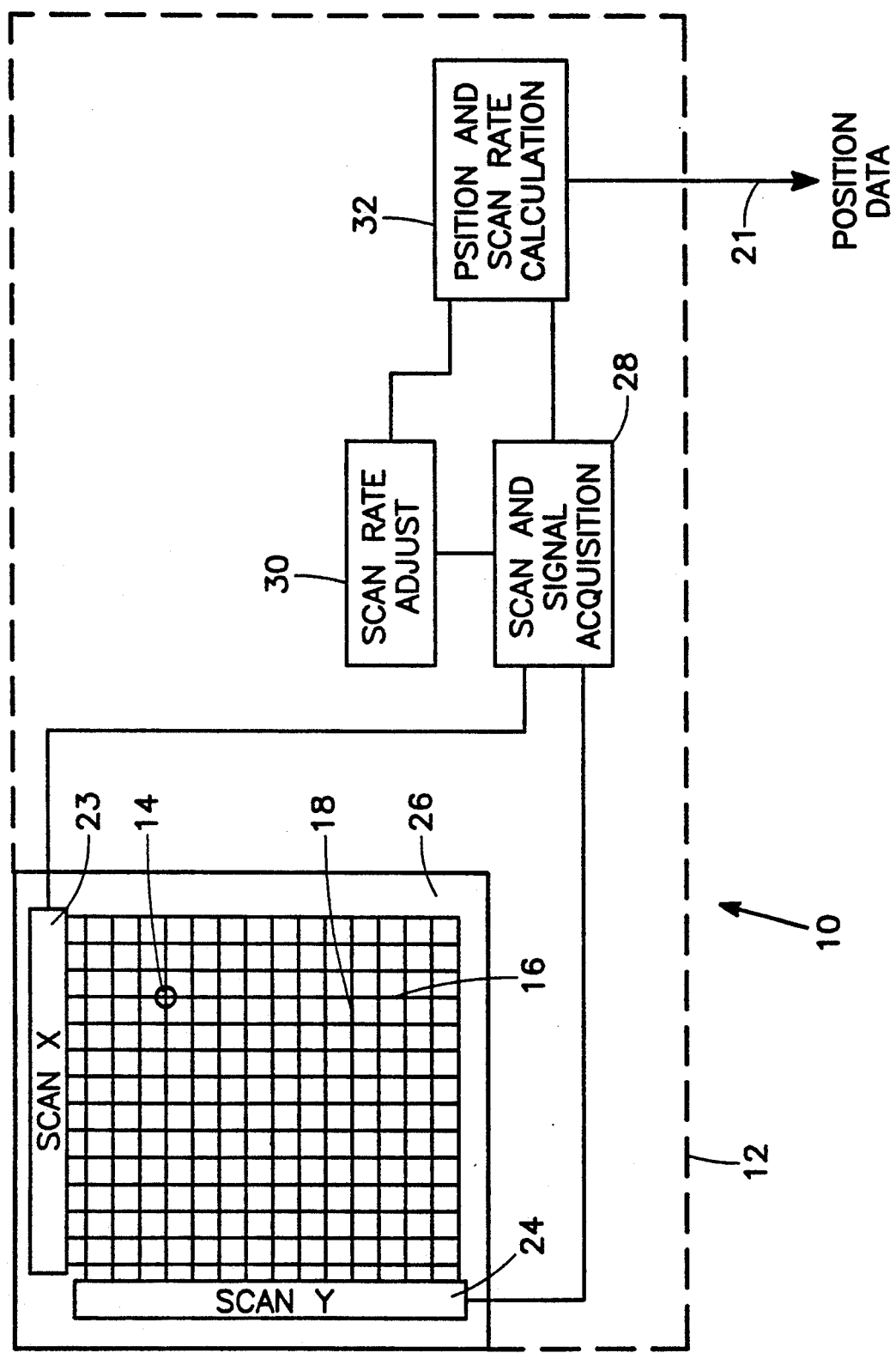
FIG. 6 is a functional block diagram of a digitizer system operating according to the present invention.

Digitizing apparatus according to the present invention is depicted in FIG. 6. The electro-magnetic digitizer 10 comprises a tablet 12 over which a cursor 14 is moved to input positional information to a computer (not shown) connected to the output wire 21. The tablet 12 contains a grid of wires used to sense the position of the cursor 14 on the scanning surface 26. There are a plurality of equally-spaced X-wires 16 and a plurality of equally-spaced Y-wires 18 perpendicular to the X-wires 16. The X-wires 16 are scanned by scanning apparatus 23 and the Y-wires 18 are scanned by scanning apparatus 24. The scanning apparatus 23, 24 is connected to and driven by the scanning and signal acquisition apparatus 28. The positional signal acquired by the scanning and signal acquisition apparatus 28 are output to the position and scan rate calculation apparatus 30 which outputs the positional data on the output wire 21. All the foregoing aspects are conventional to such a digitizer tablet system. For purposes of the present invention, scan rate adjusting apparatus 32 is connected to the scanning and signal acquisition apparatus 28 to adjust the scanning of the X-wires 16 and the Y-wires 18 according to the present invention as previously described. The scan rate adjusting apparatus 32 is driven by the position and scan rate calculation apparatus 30 which performs the logic of FIG. 5 in addition to its normal position determination functions.

Wherefore, having thus described the present invention, what is claimed is:

1. In a digitizer tablet having grid wires that are sequentially and repetitively scanned to develop a positional signal related to a cursor, a method of setting the signal-sampling period of each wire to reduce jitter associated with non-movement of the cursor and signal error associated with rapid movement of the cursor comprising periodically performing the steps of:
   a) comparing the present position of the cursor to the prior position of the cursor when the steps of the method were performed previously;
   b) if the cursor has not moved from the prior position, setting the signal-sampling period of each wire to a longest signal-sampling period the digitizer tablet is designed to employ and proceeding to step (f);
   c) if the cursor has moved from the prior position, determining the present speed of movement of the cursor;
   d) determining a signal-sampling period of each wire inversely related to the present speed of movement of the cursor such that the faster the present speed of movement of the cursor, the shorter the signal-sampling period of each wire as compared to the longest signal-sampling period the digitizer tablet is designed to employ;
   e) setting the signal-sampling period of each wire to that determined in step (d); and,
   f) saving the present position of the cursor as the prior position of the cursor.

2. The method of setting the signal-sampling period of each wire in a digitizer tablet having grid wires that are sequentially and repetitively scanned to develop a positional signal of claim 1 wherein:
   the steps of the method are performed before each time the wires of the digitizer tablet are sequentially scanned.

3. A method of setting the signal-sampling period of each wire in a digitizer tablet having grid wires that are sequentially and repetitively scanned to develop a positional signal related to a cursor so as to reduce jitter associated with non-movement of the cursor and signal error associated with rapid movement of the cursor comprising the steps of:
   a) comparing the present position of the cursor to the prior position of the cursor when the steps of the method were performed previously;
   b) if the cursor has not moved from the prior position, setting the signal-sampling period of each wire to a longest signal-sampling period the digitizer tablet is designed to employ and proceeding to step (f);
   c) if the cursor has moved from the prior position, determining the present speed of movement of the cursor;
   d) determining a signal-sampling period of each wire inversely related to the present speed of movement of the cursor such that the faster the present speed of movement of the cursor, the shorter the signal-sampling period of each wire as compared to the longest signal-sampling period the digitizer tablet is designed to employ;
   e) setting the signal-sampling period of each wire to that determined in step (d); and,
   f) saving the present position of the cursor as the prior position of the cursor.

4. The method of claim 3 wherein:
   the method is performed each time the wires of the digitizer tablet are sequentially scanned prior to the scanning thereof.

5. In a positional sensing device having sensing elements that are sequentially and repetitively scanned to develop a positional signal related to a cursor, a method of setting the signal-sampling period of each sensing element to reduce jitter associated with non-movement of the cursor and signal error associated with rapid movement of the cursor comprising periodically performing the steps of:
   a) comparing the present position of the cursor to the prior position of the cursor when the steps of the method were performed previously;

b) if the cursor has not moved from the prior position, setting the signal-sampling period of each sensing element to a longest signal-sampling period the positional sensing device is designed to employ and proceeding to step (f);

c) if the cursor has moved from the prior position, determining the present speed of movement of the cursor;

d) determining a signal-sampling period of each sensing element inversely related to the present speed of movement of the cursor such that the faster the present speed of movement of the cursor, the shorter the signal-sampling period of each sensing element as compared to the longest signal-sampling period the positional sensing device is designed to employ;

e) setting the signal-sampling period of each sensing element to that determined in step (d); and, f) saving the present position of the cursor as the prior position of the cursor.

6. The method of setting the signal-sampling period of each sensing element in a positional sensing device having sensing elements that are sequentially and repetitively scanned to develop a positional signal of claim 5 wherein:

the steps of the method are performed before each time the sensing elements of the positional sensing device are sequentially scanned.

7. A method of setting the signal-sampling period of each sensing element in a positional sensing device having sensing elements that are sequentially and repetitively scanned to develop a positional signal related to a cursor so as to reduce jitter associated with non-movement of the cursor and signal error associated with rapid movement of the cursor comprising the steps of:

a) comparing the present position of the cursor to the prior position of the cursor when the steps of the method were performed previously;

b) if the cursor has not moved from the prior position, setting the signal-sampling period of each sensing element to a longest signal-sampling period the positional sensing device is designed to employ and proceeding to step (f);

c) if the cursor has moved from the prior position, determining the present speed of movement of the cursor;

d) determining a signal-sampling period of each sensing element inversely related to the present speed of movement of the cursor such that the faster the present speed of movement of the cursor, the shorter the signal-sampling period of each sensing element as compared to the longest signal-sampling period the positional sensing device is designed to employ;

e) setting the signal-sampling period of each sensing element to that determined in step (d); and, f) saving the present position of the cursor as the prior position of the cursor.

8. The method of claim 7 wherein:

the method is performed each time the sensing elements of the positional sensing device are sequentially scanned prior to the scanning thereof.

9. In a positional sensing device having sensing elements that are sequentially and repetitively scanned by scanning apparatus to develop a positional signal related to a cursor, apparatus for setting the signal-sampling period of each sensing element to reduce jitter associated with non-movement of the cursor and signal error associated with rapid movement of the cursor comprising:

a) scanning rate adjustment apparatus connected to the scanning apparatus for adjusting the signal-sampling period of each sensing element of the scanning apparatus; and, b) control apparatus connected to said scanning rate adjustment apparatus for inputting signal-sample period values to said scanning rate adjustment apparatus by, b1) comparing the present position of the cursor to the prior position of the cursor, b2) if the cursor has not moved from the prior position, setting the signal-sampling period value so that the signal-sampling period of each sensing element is a longest signal-sampling period the positional sensing device is designed to employ and proceeding to (b6), b3) if the cursor has moved from the prior position, calculating the present speed of movement of the cursor;

b4) determining a signal-sampling period of each sensing element inversely related to the present speed of movement of the cursor such that the faster the present speed of movement of the cursor, the shorter the signal-sampling period of each sensing element as compared to the longest signal-sampling period the positional sensing device is designed to employ;

b5) setting the signal-sampling period value so that the signal-sampling period of each sensing element is that determined in (b4), and, b6) saving the present position of the cursor as the prior position of the cursor.

10. In a digitizing tablet having grid wires that are sequentially and repetitively scanned by scanning apparatus to develop a positional signal related to a cursor, apparatus for setting the signal-sampling period of each grid wire to reduce jitter associated with non-movement of the cursor and signal error associated with rapid movement of the cursor comprising:

a) scanning rate adjustment apparatus connected to the scanning apparatus for adjusting the signal-sampling period of each grid wire of the scanning apparatus; and, b) control apparatus connected to said scanning rate adjustment apparatus for inputting signal-sample period values to said scanning rate adjustment apparatus by, b1) comparing the present position of the cursor to the prior position of the cursor, b2) if the cursor has not moved from the prior position, setting the signal-sampling period value so that the signal-sampling period of each grid wire is a longest signal-sampling period the digitizer tablet is designed to employ and proceeding to (b6), b3) if the cursor has moved from the prior position, calculating the present speed of movement of the cursor;

b4) determining a signal-sampling period of each grid wire inversely related to the present speed of movement of the cursor such that the faster the present speed of movement of the cursor, the shorter the signal-sampling period of each grid wire as compared to the longest signal-sampling period the digitizer tablet is designed to employ;

b5) setting the signal-sampling period value so that the signal-sampling period of each grid wire is that determined in (b4), and, b6) saving the present position of the cursor as the prior position of the cursor.

11. In a positional sensing device having sensing elements that are sequentially and repetitively scanned by scanning apparatus to develop a positional signal related to a cursor, apparatus for setting the signal-sampling period of each sensing element to reduce jitter associated with non-movement of the cursor and signal error associated with rapid movement of the cursor comprising:

a) scanning rate adjustment apparatus connected to the scanning apparatus for adjusting the signal-sampling period of each sensing element of the scanning apparatus; and, b) control apparatus connected to said scanning rate adjustment apparatus for inputting signal-sample period values to said scanning rate adjustment apparatus, said control apparatus comprising, b1) means for comparing the present position of the cursor to the prior position of the cursor, b2) means for if the cursor has not moved from the prior position, setting the signal-sampling period value so that the signal-sampling period of each sensing element is a longest signal-sampling period the positional sensing device is designed to employ and proceeding to (b6), b3) means for if the cursor has moved from the prior position, calculating the present speed of movement of the cursor;

b4) means for determining a signal-sampling period of each sensing element inversely related to the present speed of movement of the cursor such that the faster the present speed of movement of the cursor, the shorter the signal-sampling period of each sensing element as compared to the longest signal-sampling period the positional sensing device is designed to employ;

b5) means for setting the signal-sampling period value so that the signal-sampling period of each sensing element is that determined in (b4), and, b6) means for saving the present position of the cursor as the prior position of the cursor.

12. In a digitizing tablet having grid wires that are sequentially and repetitively scanned by scanning apparatus to develop a positional signal related to a cusor, apparatus for setting the signal-sampling period of each grid wire to reduce jitter associated with non-movement of the cursor and signal error associated with rapid movement of the cursor comprising:

a) scanning rate adjustment apparatus connected to the scanning apparatus for adjusting the signal-sampling period of each grid wire of the scanning apparatus; and, b) control apparatus connected to said scanning rate adjustment apparatus for inputting signal-sample period values to said scanning rate adjustment apparatus, said control apparatus comprising, b1) means for comparing the present position of the cursor to the prior position of the cursor, b2) means for if the cursor has not moved from the prior position, setting the signal-sampling period value so that the signal-sampling period of each grid wire is a longest signal-sampling period the digitizer tablet is designed to employ and proceeding to (b6), b3) means for if the cursor has moved from the prior position, calculating the present speed of movement of the cursor;

b4) means for determining a signal-sampling period of each grid wire inversely related to the present speed of movement of the cursor such that the faster the present speed of movement of the cursor, the shorter the signal-sampling period of each grid wire as compared to the longest signal-sampling period the digitizer tablet is designed to employ;

b5) means for setting the signal-sampling period value so that the signal-sampling period of each grid wire is that determined in (b4), and, b6) means for saving the present position of the cursor as the prior position of the cursor.

* * * * *